Figure 1:
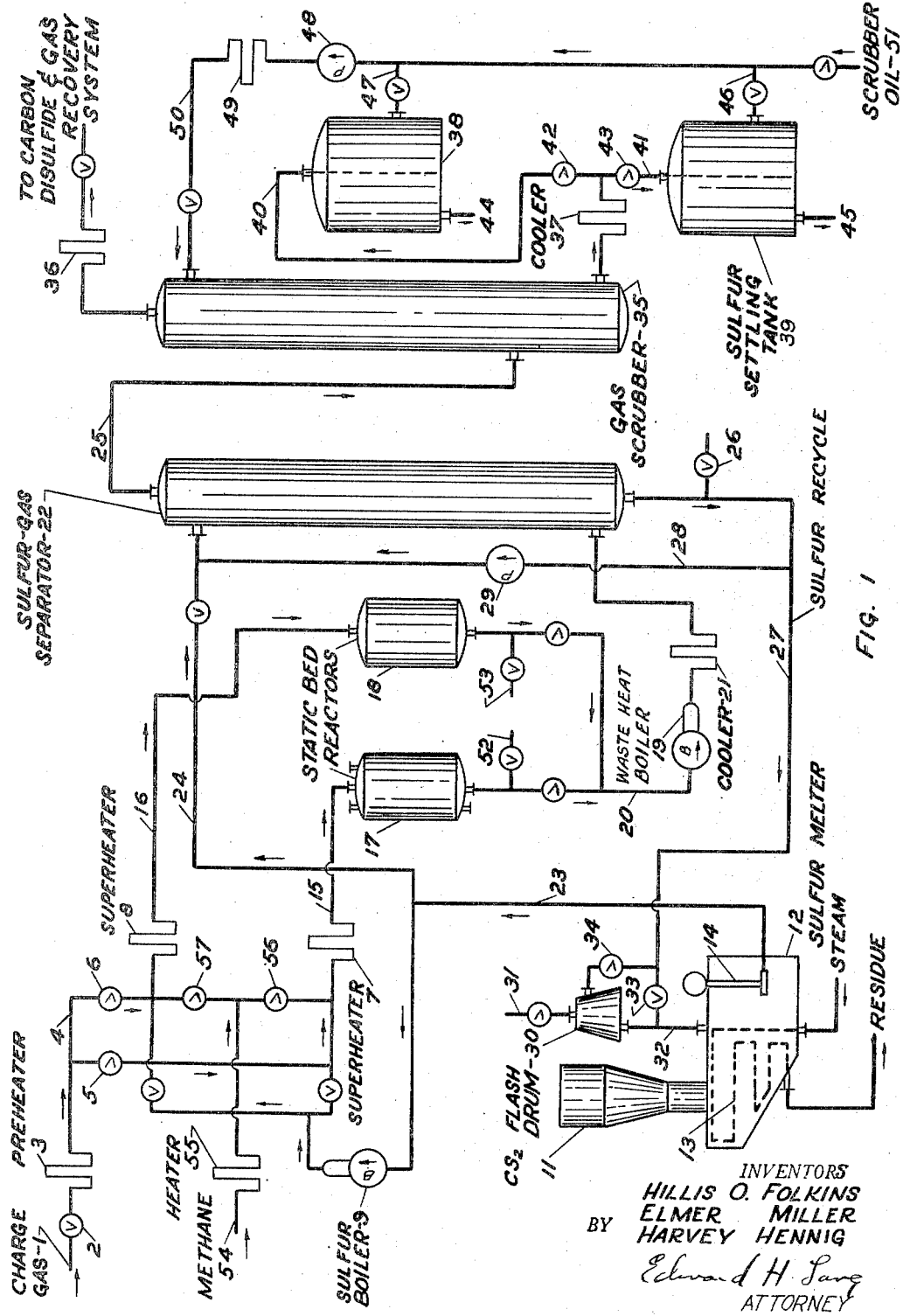

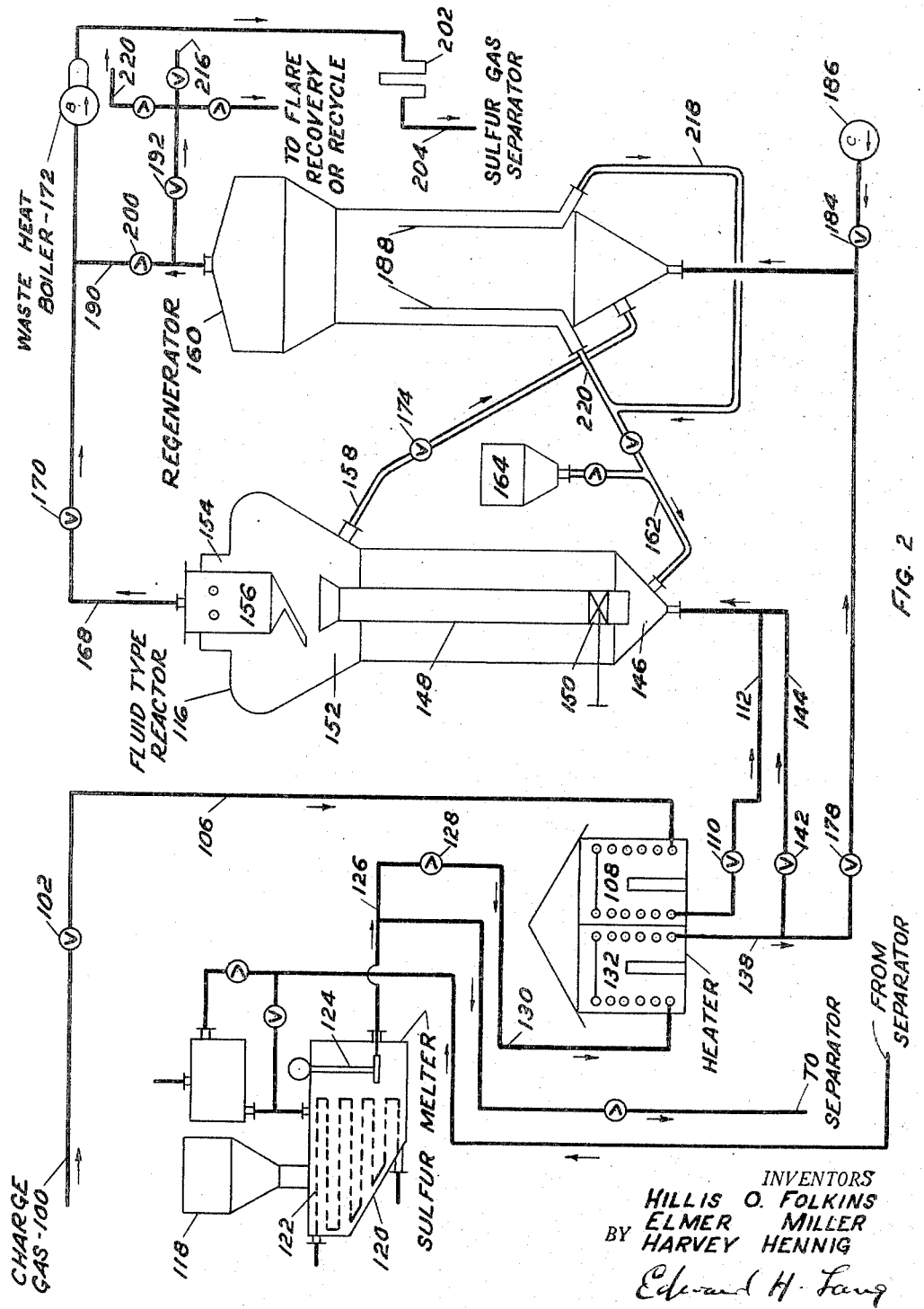

United States Patent Office 2,709,639
Patented May 31, 1955

2,709,639

PROCESS FOR THE MANUFACTURE OF CARBON DISULFIDE

Hillis O. Folkins, Skokie, and Elmer Miller and Harvey Hennig, Evanston, Ill., assignors, by mesne assignments, to Food Machinery and Chemical Corporation, New York, N. Y., a corporation of Delaware Application July 27, 1948, Serial No. 40,934

9 Claims. (Cl. 23—206)

The present invention relates to a method for the preparation of carbon disulfide by the reaction of sulfur with hydrocarbons and is more particularly concerned with a method of preventing side reactions and tar formation, and maintaining catalyst activity during such preparation.

It is known to prepare carbon disulfide by the reaction of hydrocarbon gases with sulfur at elevated temperatures in the presence of catalytic material. The reaction most generally is carried out by passing a mixture of hydrocarbon gases and sulfur vapor over a catalyst selected from the group consisting of activated alumina, silica gel, fuller's earth, bauxite and synthetic silica-alumina. A further refinement of the reaction is to preheat the mixture of hydrocarbon gases and sulfur vapor to a temperature between 850°–1300° F. prior to contact with the catalyst. These catalysts are sometimes used alone or in admixture with one or more metal compounds of metals of groups V, VI, VII and VIII of the periodic table. In addition, various oxides or sulfides of iron, chromium, manganese, molybdenum and vanadium are useful as catalyst promoters when used with the activated alumina, silica gel, fuller's earth, bauxite, or other porous carrier. Space velocities are variable between rather wide limits depending upon the conditions of operation employed and although higher or lower space velocities are operable, the preferred range is from 400 to 5000. For purposes of this description and the following more detailed discussion of the invention, space velocity is defined as the ratio of total volume of gases (sulfur vapor calculated as the $S_2$ modification) at 32° F. and 14.7 pounds absolute pressure passing over the catalyst per hour to the volume of space which the catalyst occupies. The process may be carried out at subatmospheric, atmospheric or at superatmospheric pressures up to 500 pounds per square inch or above. The preferred range is from atmospheric to about 100 pounds per square inch.

Variations of the conditions of temperature and pressure are allowable over a wide range with satisfactory yields being obtained, but those conditions which maintain the reactants in the vapor phase are preferred.

Any desired ratio of sulfur and hydrocarbons may be used but it is preferred to use an amount of sulfur in excess of the stoichiometric ratio required to yield carbon disulfide and hydrogen sulfide, such excess being of the order of about 10 to 30 molal per cent. When the feed hydrocarbon vapors are predominantly $C_1$ and $C_2$ hydrocarbons, namely, methane and ethane, the reaction progresses with the production of carbon disulfide and hydrogen sulfide and little or no side reaction products result. Difficulty is experienced, however, when a feed stock, comprised predominantly of one type hydrocarbon, but containing substantial amounts of hydrocarbons heavier and/or more reactive than the main component, is subjected to the same reaction with sulfur. When a feed stock, of a which the main component is methane such as natural or manufactured gas, but which contains a minor portion of hydrocarbons having three or more carbon atoms per molecule, is reacted with sulfur vapor or liquid to form carbon disulfide, the reaction of the $C_3$ and heavier hydrocarbon fraction of the feed stock to form carbon disulfide is accompanied by the formation of viscous polymeric sulfur containing compounds. This is due to side reactions which degrade into tar and coke, leading to decreased catalyst activity, decline in production and difficulties in catalyst regeneration. Similarly, the presence of substantial amounts of hydrocarbons having four or more carbon atoms per molecule in a hydrocarbon mixture, such as one in which the main component is propane, will tend toward side reactions and tar formation. Consequently, continuous methods for the preparation of carbon disulfide from hydrocarbon feed stocks containing components which tend to decompose into tar and coke or yield viscous polymers in the presence of sulfur has been beset by inefficiency, catalyst losses and troublesome plugging of equipment. Further, the products of these side reactions seem to be autocatalytic with time to the detriment of carbon disulfide formation.

We have discovered that side reactions can be eliminated or substantially reduced and catalyst efficiency maintained at a high level in the preparation of carbon disulfide from natural or other hydrocarbon gas, containing substantial amounts of heavier and more reactive hydrocarbons, such as propane and butanes and their corresponding olefins by reactivating the catalyst at definite intervals dependent upon the composition of the charge and conditions of the reaction.

Accordingly, it is an object of this invention to improve the efficiency of processes for the conversion of hydrocarbons into organic sulfur compounds, particularly the conversion of hydrocarbon gases to carbon disulfide.

It is a second object of the invention to provide effective and efficient means for the reduction of side reactions during the preparation of carbon disulfide from hydrocarbons containing 3 or more carbon atoms in the molecule, and more particularly using a hydrocarbon feed stock comprising propane.

It is a third object of this invention, to provide an improved process for the conversion of hydrocarbons to sulfur-containing organic compounds in which the efficiency of the catalyst is maintained at a high level.

It is a fourth object of this invention to provide a method for conducting the conversion of hydrocarbons to high yields of carbon disulfide through catalytic reaction with sulfur whereby the formation of tar and coke and other troublesome by-products which clog equipment, deactivate the catalyst and decrease the production of carbon disulfide is substantially minimized.

It is a fifth object of this invention to provide a continuous process for the production of carbon disulfide and a continuous process for regenerating the catalyst therefrom with over-all catalyst efficiency maintained at constant level.

A further object of this invention is to provide a method for converting hydrocarbons into carbon disulfide wherein the catalyst activity is maintained at the height of efficiency at all times regardless of the rate of reaction or the rate of catalyst deterioration.

Other objects and advantages of the invention will be apparent from the following more detailed description.

We have discovered that the conversion of hydrocarbon gases, particularly those containing a high percentage of propane or other hydrocarbons having a tendency to side reactions, to carbon disulfide can be conducted at a continuous high level of conversion efficiency when the catalyst is continuously or intermittently reactivated immediately before detrimental side reactions are initiated. In addition, we have found that regeneration cycles can be conducted in a manner which will not interfere with the carbon disulfide producing reaction, nor will the mode of regeneration interfere with other minor changes in conditions which have proven beneficial to the reaction. For example, the inclusion of an inert gas, as nitrogen or flue gas, and the use of an excess of sulfur over stoichiometric requirements to completely react with the carbon content of the hydrocarbon feed have proven to be refinements in conditions which aid in overcoming side reaction difficulties. These refinements are not interfered with by the practice of our invention; if anything, their beneficial effects are made more apparent thereby.

Our experiments have indicated that the tar-forming reaction seems to be autocatalytic and as soon as tar-like materials begin to form, there is a sharp decline in catalyst activity. Thus, it becomes important to arrange the cycles of catalyst treatment in relation to the rate of tar and coke deposition so that there is never a substantial build-up of tar or coke on the catalyst. As the reaction proceeds, it has been observed that after a certain time, the recycle sulfur is discolored and the yield of carbon disulfide simultaneously declines. At or before this point in the reaction, the catalyst may be removed, considering a moving bed type of reactor, for regeneration. It is advantageous to conduct the regeneration before side reaction products build up to substantial amount or before they begin to form, since this tends to shorten the time required for complete regeneration of the catalyst, and increases the efficiency of the operation.

The means employed in catalyst reactivation which are applicable to our process are subject to wide variation, provided the catalyst is restored thereby to substantially its original level of activity. Reactivation of the catalyst may be conducted by contact or purge with oxygen-containing gases, liquid sulfur, sulfur vapor or steam. One particular mode of reactivation of the catalyst comprises contacting it with sulfur in liquid or vapor form at or above reaction temperature. Instead of using sulfur alone, sulfur mixed with methane or methane and ethane in considerable stoichiometric deficiency may be used. Since ethane and methane exhibit little or no tendency to form coke or tar under reaction conditions, the mixture of sulfur and methane or methane and ethane will continue to form carbon disulfide during the reactivation stage while the excess sulfur in the mixture will cleanse the catalyst.

Where static catalyst chambers are used, the reaction system may be so arranged that a plurality of reaction vessels is maintained and means provided whereby one or more reaction vessels is on stream while the remaining vessels are undergoing a regeneration purge. Moving bed or fluid type operation may be used in which the catalyst is continuously removed from the reaction zone and continuously regenerated in a separate zone.

The on-stream and activation periods are dependent upon the composition of the hydrocarbon charge and the conditions of operation. When a hydrocarbon feed gas such as natural gas, which is rich in $C_3$ or higher hydrocarbons, is used, or if higher hydrocarbons, such as propane or mixtures thereof, are employed, and/or if the olefinic content of the feed stock is high, the periods of reactivation will necessarily be more frequent and possibly longer. Conversely, using hydrocarbon charge gas, such as natural gas containing about 85–90 per cent methane, about 5–7 per cent ethane and 5 per cent or less of $C_3$ or heavier hydrocarbons, the intervals between the catalyst reactivation may be as long as three hours or more, dependent upon the actual composition of the gas. In other cases, shorter regeneration periods, as low as 5–10 minutes, have been found to be adequate. Generally, cycles on stream and regeneration are arranged so that they are of equal duration. However, it may be advantageous in many instances to vary the length of cycles relative to each other by additional catalyst cases or by use of moving bed catalyst systems.

In conducting the reaction of the hydrocarbon gas and sulfur at temperatures between 850°–1300° F., the main products are carbon disulfide and hydrogen sulfide. Our observations have shown that tar formation is greater at the higher temperatures. Increase of the space velocity tends to reduce side reactions and attendant tar formation, but too high space velocities give unsatisfactory yields of carbon disulfide.

Conditions of temperature, pressure and space velocity are adjusted so that there is a minimum of cracking of the higher constituents of the hydrocarbon feed with consequent olefin formation. We have observed that those reaction conditions of temperature and time which avoid substantial thermal cracking of the hydrocarbons give maximum yields of carbon disulfide calculated on the basis of the carbon content of the feed.

In carrying out the invention, substantially pure hydrocarbons such as methane, ethane, propane or butane or mixtures thereof may be used as starting materials. The problem of catalyst deactivation and tar formation becomes acute when charge stocks such as natural or refinery gases, consisting mainly of methane and ethane, are used containing in excess of 5 per cent of $C_3$ and higher molecular weight hydrocarbons, such as propane, butanes, pentanes, hexanes, and their corresponding olefins, namely, propylene, butenes, pentenes and hexenes as well as diolefins. The use of those higher molecular weight hydrocarbons as charge stocks which tend to tar formation, either in pure form or in admixture is specifically contemplated by this invention.

Referring to the accompanying drawings, Figure 1 is diagrammatic elevational view of one form of heater, reactor and sulfur recovery section of apparatus useful in carrying out the invention.

Figure 2 is a diagrammatic elevational view of one form of fluid type reactor and regenerator contemplated by our invention.

Reference is now made to Figure 1 in which the numeral 1 indicates a line controlled by valve 2 for charging hydrocarbon gas to the process. The charge gas is heated to approximately 700°–1200° F. in heater 3, dependent upon the nature of the charge and upon conditions of operation. Temperatures as high as 1500° F. are operable, but care should be taken to avoid cracking conditions of time and temperature. In most operations it is advantageous to operate the heater so that the exit gases retain a temperature below threshold cracking temperature. The preheated charge gas passes from the heater 3 through line 4 and valves 5 or 6 to either superheater 7 or 8 where it joins the sulfur vapors coming from the sulfur boiler 9 and the combined gas-sulfur vapor stream passes through the sulfur-gas superheaters. The mixed stream of charge gas and sulfur vapors should be in contact only a very short time to prevent thermal reaction prior to entry into contact with the catalyst. The mixed stream is heated to a reaction temperature of approximately 850°–1300° F., but preferably about 1100°–1175° F.

An alternate procedure of mixing and heating may be used wherein instead of mixing the charge gas and the sulfur at the outlet of the sulfur boiler, the charge gas is introduced into the sulfur stream entering the sulfur boiler and the sulfur vaporized in the presence of the charge gas, provided the charge gas on introduction thereto is of sufficient temperature to prevent cooling of the sulfur. Another alternative is to heat the sulfur and gas separately and inject the heated reactions directly into the catalyst chamber in order to prevent substantial reaction outside the catalyst bed.

Solid sulfur is fed from sulfur hopper 11 into the sulfur melter 12, which is heated by steam coil 13. Heat is applied by means of the steam coil 13 so that the molten sulfur is kept at a temperature between approximately 250°–300° F., and preferably about 270° F. Obviously those temperatures are to be avoided at which high viscosity sulfur forms. The molten sulfur is pumped from the melter 12 by means of submerged centrifugal pump or other pump 14 suitable for handling molten sulfur through line 23 at pressures up to 100 pounds per square inch to sulfur boiler 9. The pressures under which the molten sulfur will be moved depend upon the operation pressure maintained in the reactor and on the design of equipment in general.

That portion of the equipment which is in contact with sulfur-bearing vapors at elevated temperatures is best constructed of a material which is resistant to the corrosive action of sulfur. Various stainless steel alloys, such as one containing 27 per cent chromium, one containing 25 per cent chromium and 20 per cent nickel or an alloy containing 16 to 18 per cent chromium, 10 to 14 per cent nickel and 2 to 3 per cent molybdenum have proved effective. Other materials of construction include aluminum coated steels, stainless steel alloys, refractory linings, and various types of stainless steels, such as those of the 18 per cent chromium, 8 per cent nickel series. The sulfur boiler 9 may be a tube or coil constructed from an alloy or other material highly resistant to sulfur corrosion. In the sulfur boiler 9, the sulfur is heated to a sufficiently high temperature to vaporize it, as for example 850°–1200° F. under given operating pressures. From the sulfur boiler 9, the sulfur vapors pass to either superheater 7 or 8. These superheaters are necessarily constructed of corrosion resistant alloys also.

The superheated reactants leaving the superheaters 7 or 8 pass via lines 15 or 16 to the upper portion of either reactor 17 or 18. As shown in the drawing, reactors 17 and 18 are of the static bed type, but it is to be understood that reactors 17 and 18 may be replaced by a moving bed or fluidized catalyst chamber and appropriate regeneration equipment.

The reactors may be operated isothermally or adiabatically. In either case, the suitable catalysts are silica gel, activated alumina (including alumina gel), catalytic clays, bauxite and synthetic silica-alumina catalysts containing between 2 and 10 per cent of silica or others described above for promoting the formation of carbon disulfide. Exact conditions of pressure and temperature needed for adiabatic or isothermal operation may be varied. In practicing adiabatic operation, it is preferred to heat the reactants sufficiently above desired reaction temperature to compensate for temperature drop through the reactor except in higher part of the temperature range where the reaction is exothermic. Ordinarily 25° to 50° F. over desired reaction temperature will be sufficient.

After the formation of carbon disulfide in the reactors, the products pass through the waste heat boiler 19 via line 20. In the waste heat boiler 19, the effluent products pass in indirect heat exchange with water or steam to produce high pressure steam for use in reboilers and elsewhere in the system. The reaction products leave the waste heat boiler 19 at a temperature of approximately 450° to 500° F., pass through the cooler 21 where the temperature is reduced to approximately 250° to 300° F., and finally pass to lower portion of the sulfur-gas separator 22. Instead of using a waste heat boiler and subsequent water cooler, the product cooling process may be conducted in several ways, including the use of multi-finned radiating surfaces or conventionally designed water coolers.

The sulfur-gas separator 22 may be a tower so designed to give contact between the rising gases and the various bodies of liquid sulfur supported on the plates, such as, for example bubble plates, Raschig rings or other contact surfaces. During the operation of separator 22 the plates or baffles are maintained substantially flooded with liquid sulfur at about 270° F. by the action of pump 14, the molten sulfur flowing from said pump through lines 23 and 24 to the upper part of the separator 22, collecting in the bottom of the separator and returning to the sulfur melter 12 for recycle. Absorption of the major portion of condensed and unreacted sulfur dust or particles is thus accomplished by the circulating molten sulfur stream. Assurance of a continuous flooding action in the separator may be attained by circulation of a part of the flow of molten sulfur through line 28 by pump 29. Sulfur-test draw-off valve 26 is provided for periodic removal of samples of recycle sulfur for color tests and other measurements. Carbon disulfide and hydrogen sulfide, together with any reacted hydrocarbon gas and any remaining sulfur particles exit through the top of the separator and pass via line 25 to gas scrubber 35. Generally, the pressure in the separator 22 will be sufficient to force the sulfur from the bottom of the separator to the melter without pumping. The hazard of fire in the melter 12 due to absorbed carbon disulfide is overcome by flashing off the carbon disulfide from the recycle sulfur in the flash drum 30 maintained at atmospheric pressure. The carbon disulfide so separated may be exhausted to the air or withdrawn by line 31 for recovery. The molten sulfur is returned from the flash drum 30 to the sulfur melter through line 32. By manipulation of appropriate valves 33 and 34, the recycle sulfur may be diverted either to the flash drum 30 or to the sulfur melter 12.

The remaining sulfur dust or sulfur particles in the reaction products leaving sulfur separator 22 is removed by a stream of scrubber oil in gas scrubber 35. Various lubricating and light gas oil fractions are suitable for use as a scrubber oil. The gas scrubber 35 is fitted with suitable contacting surfaces, such as Raschig rings through which the reaction products pass upwardly to contact the downward flowing stream of scrubber oil. The temperature in the scrubber will be approximately the same as in the separator. The cleaned reaction products, that is with sulfur removed, are withdrawn through the top of gas scrubber 35 and pass through cooler 36, for cooling to a temperature of 100° F. or less, before passing to a carbon disulfide and gas recovery system (not shown). The carbon disulfide and gas recovery system serves to separate hydrogen sulfide and unreacted hydrocarbons. As carbon disulfide absorber oil, hydrocarbon fractions such as petroleum naphtha having a boiling range of 250°–400° F. may be used, or such solvents as benzene and o-dichlorobenzene, etc. Thereafter the carbon disulfide is stripped from the absorber oil and fractionated to a finished product.

Scrubber oil containing absorbed sulfur passes from the bottom of scrubber 35 to cooler 37, where a temperature reduction to 100° F. or lower takes place, and from thence the cooled scrubber oil passes into the sulfur separator tanks 38 and 39 through lines 40 and 41 and valves 42 and 43. The provision of two settling tanks affords means for the continuous operation of the gas scrubber system, for while sulfur, which has been crystallized from the oil at 100° F. is settling in one tank, the balance of the system may be operated to provide oil circulation to the gas scrubber 35 followed by collection in the second tank. Separation of the sulfur sludge is accomplished by withdrawal through lines 44 or 45 after the settling period, either before or after the oil has been withdrawn. For certain purposes, it may be advantageous to withdraw the oil and crystallized sulfur from the settling tanks before complete separation has occurred. Lines 46 and 47 and pump 48 provide means for the recirculation of scrubber oil from the tanks through heater 49 where it is heated to 250°–300° F., before return via line 50 to the gas scrubber 35. Make-up scrubber oil may be added through line 51 as required.

The scrubber oil may be recycled indefinitely or withdrawn and burned or used to make high sulfur cutting oils or extreme pressure lubricants. Filters or centrifuges may be provided to separate the sulfur from the oil instead of the settling tanks.

Several specific embodiments of our invention will now be described. There are several methods of conducting the regeneration of catalysts of the type contemplated in the present invention, for example, using sulfur vapors as a regeneration medium, the process is simply one of stopping or directing the flow of incoming hydrocarbon feed stock from one reactor to the other by closing valves 2, 5 or 6. Sulfur vapors from sulfur boiler 9 are continuously passed through either or both of the reactors and the effluent gases conducted to the sulfur-gas separator 22 through the waste heat boiler 19, and the cooler 21. The regeneration may be conducted at about 500°–1200° F., but preferably at 1100° F. Pressures are best maintained at atmospheric, although superatmospheric pressure may be used. Contact between the sulfur vapors and catalyst is continued until liquid sulfur withdrawn from the reactor or from the sulfur-gas separator is free from discoloration. It is to be understood that one reactor may be undergoing regeneration while the other is on stream thereby necessitating the observance of the color of the sulfur at the exit of the reactor, instead of at draw-off valve 26 since the effluent from both reactors is conveyed to sulfur-gas separator 22. For this purpose, lines 52 and 53 may be provided for withdrawing samples of sulfur from the reactor exit line.

If a source of $C_1$ or $C_1$ and $C_2$ hydrocarbons is available, the process is easily made continuous with a single reactor. In this type of operation, a hydrocarbon gas substantially free of $C_3$ and higher molecular weight hydrocarbons is admixed with a substantial excess, usually around 30 molal per cent, of sulfur vapors over that required for the production of carbon disulfide from the $C_1$ and $C_2$ hydrocarbons. The excess sulfur then acts to simultaneously regenerate the catalyst during the production of carbon disulfide. Such an operation may be illustrated by reference to Figure 1 in which a source of methane may be conducted through line 54 through heater 55 via valves 56 or 57 to sulfur-hydrocarbon gas superheater 7 or 8. After superheating, the mixture of methane and excess sulfur may pass through the catalyst bed of reactors 17 or 18. The conditions of this reaction are subject to some variance depending on the type of equipment used. Ordinarily, temperatures of 1000° to 1200° F. are required in order to get substantial yields of carbon disulfide with accompanying efficient regeneration. Atmospheric or superatmospheric pressure sufficient to move the products through the system may be used. This reaction-regeneration is continued until the recycle sulfur samples removed from draw-off valve 26 have returned to their normal yellow color.

It will be apparent from our drawing and the valve arrangement shown that where two static bed reactors are used, one reactor may be undergoing regeneration with methane plus excess sulfur or with sulfur alone while the other reactor is being charged with a mixture of sulfur and gas containing $C_3$ and higher molecular weight hydrocarbons. By proper manipulation of the valves, the two reactors may be simultaneously reversed so that there is no heat loss through standing idle while the change over is being made.

A third method of regeneration, which is within the scope of our invention, is the use of steam. In this operation, steam at 1000°–1200° F. is injected into the reaction chamber 17 or 18 under atmospheric or superatmospheric pressure. This regeneration may be continued until the carbon dioxide or carbon monoxide content of the effluent gas as shown by analysis has fallen to zero. Whether carbon dioxide and/or carbon monoxide is formed will depend on the regeneration conditions.

A fourth method of regeneration of the catalyst after use in preparing carbon disulfide is the injection of air at 800°–1200° F. and pressures nearly atmospheric. As the regeneration proceeds and the rate of combustion of carbonaceous and tarry materials increases, there is a rise in temperature which should not be allowed to exceed 1200° F. The regeneration is continued until the carbon dioxide content of the effluent gas as shown by analysis has reached that of the air used in the regeneration. For purposes of simplicity, the necessary apparatus for steam or air regeneration have been omitted from the drawings.

The reactors 17 and 18 may be replaced by a single fluid type reactor of a design similar to that shown in Figure 2 in which reactor 116 is an elongated vertical cylindrical fluid type vessel.

The manner of operating the process of our invention utilizing the fluid technique will now be described.

Referring to Figure 2, charge gas, which may be natural gas, manufactured gas, refinery gas or mixtures thereof, or higher hydrocarbons such as propane is introduced through line 100 controlled by valve 102 through line 106 into heater 108 where it is heated to a temperature of approximately 700–1200° F., dependent upon the nature of the charge and upon contemplated reaction conditions. Care must be taken to avoid cracking the charge gas at this point. Conditions of cracking are avoided by controlling the velocity of the charge gas through heater 108. Superheated charge gases then pass through valve 110 and line 112 to fluid type reactor 116. Methane or lean natural gas for regeneration purposes may be introduced here also, if desired.

Solid sulfur is fed from sulfur hopper 118 to sulfur melter 120 and heated by steam coil 122 to a temperature of approximately 250°–300° F. Submerged centrifugal pump 124 propels the molten sulfur through line 126, valve 128 and line 130 to sulfur boiler and superheater 132. The operating principles and conditions used in the sulfur melter 120 and sulfur boiler 132 are substantially the same as those used in operating the sulfur melter and sulfur boiler for the preparation of carbon disulfide using a stationary bed type reactor. The same materials of construction are, therefore, necessary. In sulfur boiler and superheater 132, the sulfur vapors are raised to a temperature of approximately 850–1200° F., but preferably around 1100° F. The superheated sulfur vapors then pass via line 138, through valve 142 and line 144 to reactor 116.

Reactor 116 is provided with a bottom conical shaped section 146 in which the admixture of sulfur vapors and charge gas, together with fresh or regenerated catalyst takes place. A vertical catalyst return standpipe 148 provided with valve 150 for controlling the flow therein is located within reactor 116. The standpipe extends from lower conical section 146 to upper conical section 152. In conical section 152, the maximum hindered settling takes place with reaction products and catalyst fines rising to small upper section 154 for passage in cyclone separator 156. Heavier catalyst particles exit via line 158 and valve 174 to pass to regenerator 160. In operation, fresh and/or regenerated catalyst is introduced through line 162, the fresh catalyst being carried by catalyst hopper 164, to lower conical section 146 of reactor 116 to be admixed with incoming superheated sulfur vapors and charge gas. The mixture during reaction rises to conical zone 152 in which catalyst separation takes place. Reaction products are continuously withdrawn through line 168 to pass via valve 170 to waste heat boiler 172.

The stream of catalyst particles that is continuously withdrawn from the turbulent dense phase zone of the reaction chamber conical section 152 via line 158 passes through valve 174 to bottom of regenerator 160. Regenerator 160 is provided with a bottom inlet line through which the catalyst regeneration medium may be introduced. Shown in the figure are examples of regeneration with air or with sulfur; valve 178 controlling the flow of sulfur vapors from line 138 and superheater 132, and valve 184 controlling the flow of air from compressor 186. It is to be understood that if steam or if natural gas lean in $C_3$ or higher hydrocarbon is to be used as the regeneration medium, the component will be led from its proper origin and charged at this location.

Methane may also be charged to the bottom of reactor 116 to prevent or delay tar formation.

The conditions of operation are maintained substantially as in the operation of the static bed type regeneration. The regenerated catalyst is caught in the annular space defined by inner cylinder 188 for return to reactor 116. Effluent gases from the regeneration zone 160 exit through a pressure control valve 192 and line 216 at the top of regenerator 160 and pass through appropriate heat exchangers to flare, recovery or recycle. If sulfur is used as the regeneration medium, it is condensed and returned to the sulfur melter where any accumulated by-products may be removed. If methane or lean natural gas is used as the medium for regeneration, the products of regeneration leave regenerator 160 through line 190 and valve 200 to join the product stream from reactor 116 and the combined stream of products passes through waste heat boiler 172 and cooler 202 via line 204 to a sulfur gas separator system as described in conjunction with the static bed technique in Figure 1. Final purification and recovery of carbon disulfide is accomplished in a recovery system (not shown).

To check the progress of the regeneration cycle, a sample line 220 is provided in line 216 for examination of the products.

In conducting the process of our invention using the fluid type reactor as described above, it is seen that continuous improved conversion of hydrocarbons containing substantial amounts of $C_3$ and higher molecular weight hydrocarbons may be attained. The reaction conditions in fluid reactor 116 are substantially the same as those of the static bed reactor.

*Example 1.*—Using a static-bed reactor, a natural gas feed stock containing about 89 per cent methane, 5.5 per cent ethane, 3 per cent propane, 2 per cent butane and 0.5 per cent pentanes and heavier was passed with sulfur vapor at 20 pounds per square inch gauge pressure over a silica gel catalyst at 1112° F. Employing a stoichiometric ratio of sulfur vapor and gas at a total space velocity of gas and sulfur of 630 (sulfur calculated as $S_2$ and volume measured at 32° F. and 14.7 pounds pressure, absolute) an initial conversion of 78 per cent was obtained. This conversion rate was maintained for one hour, during which time the recycle sulfur was a natural yellow color. Thereafter, the recycle sulfur began to change from its natural yellow color through varying reddish colors to dark brown indicating that side reactions were taking place. Analysis of recycle sulfur showed that the carbon content increased regularly with time as did the color. The per cent conversion to carbon disulfide after five hours was about 50 per cent at which stage no further decline in per cent conversion was observed. At this point, the hydrocarbon feed stock was shut off and regeneration initiated with sulfur vapors, and a small amount of nitrogen to keep the lines open, until the recycle sulfur had returned to normal yellow color. The regeneration cycle consumed about one hour. The feed stock was again passed into the reactor under the same conditions yielding as before a 78 per cent conversion. After the reaction had proceeded until the yield per pass was at its maximum and before the recycle sulfur became darkened by tarry contaminants, the reaction was stopped and the sulfur-vapor purge repeated. The periods on stream are generally arranged so that the time on stream and that of regeneration are of approximate equal duration.

*Example 2.*—A heavier gas containing 86 per cent methane, 6.0 per cent ethane, 4 per cent propane, 2.0 per cent $C_4$ hydrocarbons and 2.0 per cent of pentanes and higher hydrocarbons was reacted with sulfur under the same conditions as described in Example 1. In about 25 minutes, indications of side reactions appeared. The gas was shut off the system and the catalyst was treated with sulfur for about 30 minutes at which time recovered sulfur was bright yellow. Subsequent treatment with gas gave the original conversion to carbon disulfide of around 79 per cent.

*Example 3.*—A hydrocarbon gas containing 94 per cent propane, 2.5 per cent ethane and 3.5 per cent of $C_4$ hydrocarbons was passed with 10 per cent excess sulfur over a silica gel catalyst at 1112° F. and at a total space velocity of 1100. After 15 minutes, evidence of side reactions occurred. The catalyst was treated with sulfur vapor for a period of 15 minutes, at which time the recovered sulfur was again clear.

*Example 4.*—A gas analyzing 88 per cent methane, 5.0 per cent ethane, 3.5 per cent propane, 2.0 per cent butanes and 1.5 per cent $C_5$ or higher molecular weight hydrocarbons, is preheated to 900° F. and reacted with sulfur vapor at 1112° F. over an activated bauxite catalyst. The gas and sulfur vapors are passed at stoichiometric ratio, at a space velocity of around 400 and at a pressure of 50 pounds' gauge pressure through the reaction chamber. An initial conversion of around 88 per cent of the available carbon to carbon disulfide is obtained. In about 30 minutes, evidence of side reactions, as shown by slight discoloration of recycle sulfur, is noted. At this time a charge gas containing about 98 per cent methane and 2 per cent ethane is substituted and used as the charge gas for the next twenty minutes. A 30 per cent excess of sulfur is maintained over that required to combine with the carbon content of the methane. Recycle sulfur will quickly clear in color and conversion is maintained around 86 per cent during this period. In subsequent operation, by alternating rich and lean charge gases every twenty minutes, no evidence of side reactions, as noted by color and carbon content of recycle sulfur, can be detected. Conversion is maintained around 86 to 88 per cent.

*Example 5.*—Referring to Figure 2, the same charge gas used in Example 2 is introduced in line 112 through valve 110 at 950° F. at about 20 pounds per square inch. Then to initiate the reaction, fresh catalyst consisting of activated alumina (200 mesh) is introduced through line 162 and sulfur vapors at stoichiometric ratio and 1120° F. are forced through feed line 144 at about 20 pounds per square inch. The temperature in the reactor is maintained at 1100° F. and the pressure at or near 20 pounds per square inch. Carbon disulfide, hydrogen sulfide, sulfur vapors and unreacted hydrocarbons are continuously withdrawn from chamber 116 through line 168 for processing in the sulfur scrubber 206. Catalyst withdrawn from line 158 at 1000° F. is introduced to regenerator 160 and purged with sulfur vapors at 1100° F. The pressure is maintained at 20 pounds per square inch and no cooling means are used during the regeneration. Effluent sulfur vapors from the regenerator 160 are conducted via line 216 through appropriate condensers and the liquid sulfur is returned to sulfur melter 120 for recycle. The regenerated catalyst is recycled via lines 218 and 220 and 162 to the reactor 116. After 11 hours of continuous operation, the yield of carbon disulfide is found to be approximately 80 per cent. It may be found that upon changing to air or steam regeneration under similar conditions, some difficulty will be experienced in controlling the regeneration temperature with consequent loss of catalyst activity. However, after 20 minutes of operation with steam or air, the proper cooling rate can be established for each so that substantially no catalyst disintegration is apparent.

Our process is not to be limited to the types and means of catalyst regeneration disclosed or claimed, for any method of regenerating carbon disulfide producing catalysts may be advantageously utilized in our process, be it conducted by the static, moving, Thermofor catalytic cracking or continuous fluid type operation.

It is to be understood that the specific examples and numerical data disclosed herein are only exemplary, and that the invention is not to be limited thereby. Our in-

What is claimed is:

1. The method for the continuous production of carbon disulfide from low boiling aliphatic hydrocarbons having a tendency to form undesirable side reactions, the steps comprising injecting the preheated hydrocarbons and a stoichiometric excess of super-heated sulfur vapors with a fluidizable catalyst capable of promoting the formation of carbon disulfide therefrom into a fluid type reactor maintained under conditions of time, temperature and pressure to form carbon disulfide, continuously withdrawing unreacted hydrocarbons, hydrogen sulfide, carbon disulfide and excess sulfur from said reactor, continuously withdrawing the catalyst from said reactor to a regeneration zone, subjecting said withdrawn catalyst to a continuous purge with sulfur vapors mixed with a hydrocarbon gas selected from the group consisting of methane and a mixture of methane and ethane, said sulfur being present in stoichiometric excess of the amount necessary to produce carbon disulfide from said hydrocarbon gas, withdrawing carbon disulfide as a product of said regeneration and returning regenerated catalyst to said reactor.

2. The method in accordance with claim 1 in which the hydrocarbons are preheated to approximately 700° to 1200° F.

3. The method in accordance with claim 1 in which the sulfur vapors are preheated to a temperature of approximately 850° to 1200° F.

4. The method in accordance with claim 1 in which the catalyst is selected from the group consisting of silica gel, activated alumina, natural clays, bauxite and mixtures thereof.

5. The method in accordance with claim 1 in which the reaction is conducted at 850° to 1300° F. and superatmospheric pressures.

6. The method in accordance with claim 1 in which the hydrocarbons are natural gas containing substantial amounts of methane.

7. The method in accordance with claim 1 in which excess sulfur is continuously separated from said reaction products and recycled to said reactor, and the rate of catalyst withdrawal and input is maintained at a value which prevents the discoloration of said recycle sulfur.

8. The method for the continuous production of carbon disulfide from low boiling aliphatic hydrocarbons containing constituents which form tars and polymers under the conditions of the reaction, the steps comprising injecting the preheated hydrocarbons and a stoichiometric excess of sulfur with a fluidizable catalyst capable of promoting the formation of carbon disulfide therefrom into a fluid type reactor maintained under conditions of time, temperature, and pressure to form carbon disulfide, continuously withdrawing unreacted hydrocarbons, hydrogen sulfide, carbon disulfide, and excess sulfur from said reactor, continuously withdrawing the catalyst from said reactor to a regeneration zone, subjecting said withdrawn catalyst to a continuous purge with a regenerative atmosphere comprising a hydrocarbon gas selected from the group consisting of methane and a mixture of methane and ethane together with an excess of sulfur over the stoichiometric amount required to convert said hydrocarbon gas to carbon disulfide and carbon disulfide is continuously produced during said regeneration and returning regenerated catalyst to said reactor.

9. The method for the continuous production of carbon disulfide from low boiling aliphatic hydrocarbons containing constituents which form tars and polymers under the conditions of the reaction, the steps comprising injecting the preheated hydrocarbons and a stoichiometric excess of sulfur with a fluidizable catalyst capable of promoting the formation of carbon disulfide therefrom into a fluid type reactor maintained under conditions of time, temperature, and pressure to form carbon disulfide, continuously withdrawing unreacted hydrocarbons, hydrogen sulfide, carbon disulfide, and excess sulfur from said reactor, continuously withdrawing the catalyst from said reactor to a regeneration zone, subjecting said withdrawn catalyst to a continuous purge with a regenerative atmosphere comprising sulfur vapors and said regeneration is conducted by contacting said catalyst at temperatures above the boiling point of sulfur under existing pressure conditions and returning regenerated catalyst to said reactors.

References Cited in the file of this patent

UNITED STATES PATENTS

| Number | Name | Date |
|---|---|---|
| 2,187,393 | De Simo | Jan. 16, 1940 |
| 2,304,653 | Pyzel et al. | Dec. 8, 1942 |
| 2,330,934 | Thacker | Oct. 5, 1943 |
| 2,428,727 | Thacker | Oct. 7, 1947 |
| 2,443,854 | Ferguson | June 22, 1948 |
| 2,447,003 | Gamson | Aug. 17, 1948 |

OTHER REFERENCES

Kalbach: "Chem. and Met. Eng.," pages 94–98, June 1944.